R. LEE.
Composite Roof.

No. 168,032. Patented Sept. 21, 1875.

Witnesses.
Otto Hufeland
Chas Wahlers

Inventor.
Richard Lee
per
Van Santvoord & Hauff
Attys

UNITED STATES PATENT OFFICE.

RICHARD LEE, OF NEW YORK, N. Y.

IMPROVEMENT IN COMPOSITE ROOFS.

Specification forming part of Letters Patent No. 168,032, dated September 21, 1875; application filed August 6, 1875.

*To all whom it may concern:*

Be it known that I, RICHARD LEE, of the city, county, and State of New York, have invented a new and useful Improvement in Roofing and Flooring, which improvement is fully set forth in the following specification, reference being had to the accompanying drawing, in which—

Figure 1:
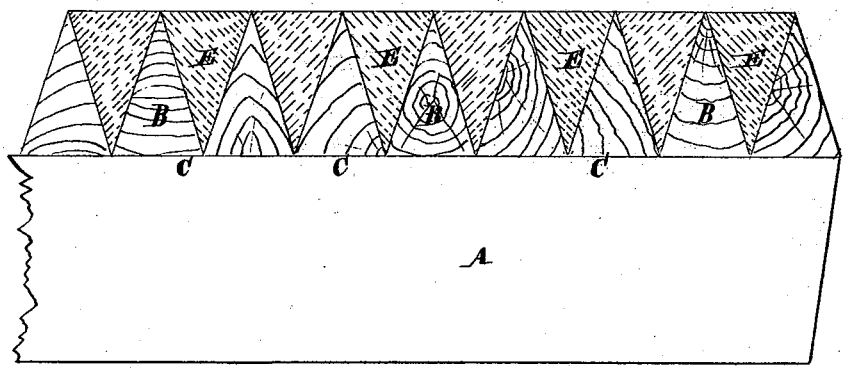
Figure 2:
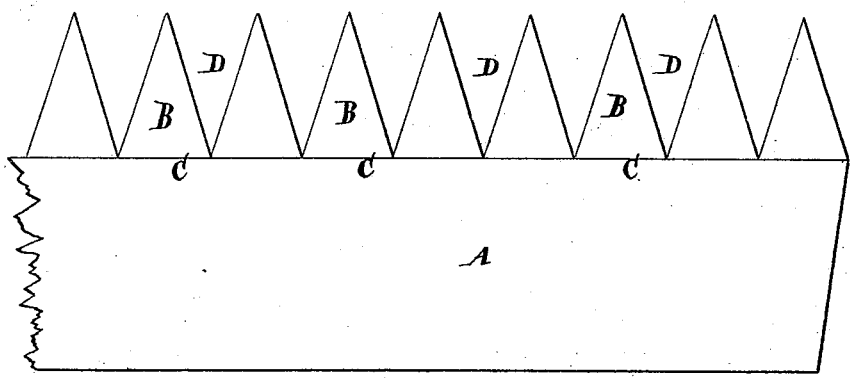
Figure 3:
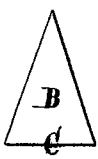

Figure 1 is an end view of my improvement. Fig. 2 is a like view of the same after the sheathing has been put on and before the composition has been applied. Fig. 3 is an end view of one of the sheathing-strips.

This invention relates to roofing and flooring where plastic composition or coating is used to cover the surface of the roof; and it consists in a series of angular slats secured upon the rafters in such a manner as to form a close sheathing where they join the rafters, and a corrugated, scalloped, or recessed upper surface, upon which a water-proof coating or material is applied in such a manner as to fill the recesses flush with the higher parts of the sheathing-pieces, the recesses forming a series of receptacles which receive and retain the coating composition or material, and the coating serving to cover and protect the sheathing from the weather, and close the crevices and form a tight roof.

The letter A designates one of the rafters of a roof, upon which are secured, by nails or other suitable fastening device, sheathing-pieces B, whose bottom surface C is flat, so that they can be applied snugly upon the rafters, and whose upper surface is conical or ridge shaped, so that when the sheathing pieces are laid in a series close to each other upon the rafters their upper surfaces form a succession of recesses or depressions, D, resembling in this example the serrations of a saw, which form receptacles for a roofing composition.

The sheathing pieces B are made with straight and parallel edges to their under surfaces, and are placed next to each other on the rafters, so that the edges of their under surfaces form close joints with each other, said joints being sufficiently tight to prevent the coating from running through them.

I fill the recesses or depressions D with any suitable roofing composition or coating, E, so as to cover the upper surface of the sheathing-pieces and protect them from the weather, forming a smooth, continuous, or unbroken surface suitable for the purposes of a roof-surface.

The coating which I prefer consists of a composition made of india-rubber, dissolved by any suitable solvent, mixed with sand and metallic paint in such proportions as to form a plastic or liquid mass, which can be easily applied to the roof so as to fill the depressions D.

The proportions of the ingredients are as follows:

India-rubber, dissolved, about 12 $\begin{cases} \text{gallons;} \\ \text{pounds;} \end{cases}$ Metallic paint, about 50 $\begin{cases} \text{gallons;} \\ \text{pounds;} \end{cases}$ and sand sufficient to bring the mixture to a plastic state, when it is ready for use. The coating soon hardens in the atmosphere and forms a durable covering to the sheathing, protecting it from the weather, and being itself held by the depressions.

I do not confine myself to any particular material in forming the sheathing, nor do I confine myself to any particular form for the sheathing-pieces, nor to any particular form of recesses or depressions D, as my invention can be carried out with any suitable material and form of upper surface of sheathing-pieces, it being, however, essential that when the blocks are placed next to each other, the series form together a broken, corrugated, or irregular surface, which will serve the purpose of receiving and retaining the coating or composition.

What I claim as new, and desire to secure by Letters Patent, is—

1. The sheathing-pieces B, constructed and applied substantially as above described, so that their under sides form a continuous close surface, and their upper surfaces form a succession of receptacles, D, for the reception of a coating material, substantially as set forth.

2. The combination of the sheathing-pieces B, made and applied to the rafters or floor-beams A, substantially as described, with a coating, E, in such a manner that the coating fills the depressions D formed by the sheathing-pieces, substantially as set forth.

3. The above-described composition of india-rubber, metallic paint, and sand, as a coating for roofs, substantially as set forth.

In testimony that I claim the foregoing I have hereunto set my hand and seal this 31st day of July, 1875.

RICHARD LEE. [L. S.]

Witnesses:
S. H. LYON,
W. HAUFF.